United States Patent
Liu et al.

(10) Patent No.: US 11,385,796 B2
(45) Date of Patent: Jul. 12, 2022

(54) METHOD, DEVICE, AND PROGRAM PRODUCT FOR REDUCING DELAY IN I/O PROCESSING DUE TO MIRRORING OF CACHE DATA

(71) Applicant: EMC IP Holding Company LLC, Hopkinton, MA (US)

(72) Inventors: Yousheng Liu, Beijing (CN); Ruiyong Jia, Beijing (CN); Xinlei Xu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 208 days.

(21) Appl. No.: 16/575,466

(22) Filed: Sep. 19, 2019

(65) Prior Publication Data
US 2020/0133507 A1    Apr. 30, 2020

(30) Foreign Application Priority Data
Oct. 31, 2018 (CN) .......................... 201811290049.X

(51) Int. Cl.
| | |
|---|---|
| *G06F 3/06* | (2006.01) |
| *G06F 12/0882* | (2016.01) |
| *G06F 9/30* | (2018.01) |
| *G06F 11/14* | (2006.01) |

(52) U.S. Cl.
CPC .......... *G06F 3/0611* (2013.01); *G06F 3/0607* (2013.01); *G06F 3/0635* (2013.01); *G06F 3/0656* (2013.01); *G06F 9/30123* (2013.01); *G06F 11/1471* (2013.01); *G06F 12/0882* (2013.01)

(58) Field of Classification Search
CPC .... G06F 3/0611; G06F 3/0607; G06F 3/0635; G06F 3/0656; G06F 9/30123; G06F 11/1471; G06F 12/0882
See application file for complete search history.

(56) References Cited

U.S. PATENT DOCUMENTS

| | | | |
|---|---|---|---|
| 7,447,833 B2 | 11/2008 | Burroughs et al. | |
| 7,447,834 B2 | 11/2008 | Burroughs et al. | |
| 8,194,547 B1 | 6/2012 | Sardella et al. | |
| 9,817,607 B1 | 11/2017 | Harvey | |
| 9,836,404 B2 * | 12/2017 | Ummadi | G06F 3/0619 |
| 9,910,753 B1 | 3/2018 | Tringale et al. | |
| 10,146,696 B1 | 12/2018 | Krigovski et al. | |

(Continued)

*Primary Examiner* — Eric Cardwell
(74) *Attorney, Agent, or Firm* — BainwoodHuang

(57) ABSTRACT

Techniques perform storage management. Such techniques involve: in response to receiving, at a first processor of a storage system, a write request from a host for writing user data, caching the user data in a first cache of the first processor, and generating cache metadata in the first cache, the cache metadata including information associated with writing the user data; sending the user data and the cache metadata to a second cache of a second processor, for the second processor to perform, in the second cache, data processing related to cache mirroring by the second processor; and sending, to the host, an indication of completion of the write request, without waiting for the second processor to complete the data processing. Such techniques can improve system performance such as reducing latency, and shortening length of the I/O handling path of write request.

24 Claims, 12 Drawing Sheets

(56) References Cited

U.S. PATENT DOCUMENTS

| | | |
|---|---|---|
| 10,303,396 B1 | 5/2019 | Harvey |
| 10,372,345 B1 | 8/2019 | Lecrone et al. |
| 10,521,137 B1 | 12/2019 | Xu et al. |
| 10,810,123 B1 | 10/2020 | Xu et al. |
| 10,922,119 B2 | 2/2021 | Yang et al. |
| 11,010,060 B2 | 5/2021 | Lecrone et al. |
| 11,074,113 B1 | 7/2021 | Ivester et al. |
| 2007/0150665 A1* | 6/2007 | Arimilli .............. G06F 11/2097 711/145 |
| 2008/0222500 A1* | 9/2008 | Tsukamoto ......... G06F 11/1004 714/807 |

* cited by examiner

METHOD, DEVICE, AND PROGRAM PRODUCT FOR REDUCING DELAY IN I/O PROCESSING DUE TO MIRRORING OF CACHE DATA

CROSS-REFERENCE TO RELATED APPLICATION

This application claims priority to Chinese Patent Application No. CN201811290049.X, on file at the China National Intellectual Property Administration (CNIPA), having a filing date of Oct. 31, 2018, and having "METHOD, DEVICE, AND PROGRAM PRODUCT FOR REDUCING DELAY IN I/O PROCESSING DUE TO MIRRORING OF CACHE DATA" as a title, the contents and teachings of which are herein incorporated by reference in their entirety.

FIELD

Embodiments of the present disclosure generally relate to a computer system or a storage system, and more specifically, to a method, an electronic device and a computer program product for reducing latency of mirroring cache data in I/O handling.

BACKGROUND

Typically, users of a storage system may access the storage system with a host. Application software may run on the host, and the storage system provides service of data storage to the host. A front end bus may be used for data transfer between the host and the storage system. As the name suggests, in a dual processor storage system, there are two processors for providing storage service to the host, which may be referred to as storage processors (SPs). The two processors may be connected via an internal communication channel which, for example, may be referred to as communication manager interface (CMI). The two processors may synchronize data and internal states to each other through the communication channel, and so on. At a back end of the storage system, storage disks may be connected to the two processors via a back end bus.

However, in a conventional dual processor storage system, there are still a lot of problems in operations of data mirroring between the two processors, for example, a complicated flow for responding to I/O requests sent from a host, overlong latency, poor performance and the like. This makes the conventional dual processor storage system cannot satisfy users' demands in many scenarios, leading to a poor user experience.

SUMMARY

Embodiments of the present disclosure relate to a method, an electronic device and a computer program product for reducing latency of mirroring cache data in I/O handling.

In a first aspect of the present disclosure, there is provided a method of storage management. The method includes: in response to receiving, at a first processor of a storage system, a write request from a host for writing user data to the storage system, caching the user data in a first cache of the first processor, and generating cache metadata in the first cache, the cache metadata including information associated with writing the user data to the storage system; sending the user data and the cache metadata to a second cache of a second processor of the storage system, for the second processor to perform, in the second cache data processing related to cache mirroring; and sending, to the host, an indication of completion of the write request, without waiting for the second processor to complete the data processing.

In a second aspect of the present disclosure, there is provided a method of storage management. The method includes: receiving, at a second processor of a storage system, user data and cache metadata from a first cache of a first processor of the storage system, the cache metadata including information associated with writing the user data to the storage system; preprocessing the cache metadata, such that the user data is accessible to a host via the second processor; and performing, in a second cache of the second processor, data processing related to cache mirroring based on the user data and the cache metadata.

In a third aspect of the present disclosure, there is provided an electronic device. The electronic device includes at least two processors and at least one memory storing computer program instructions. The at least one memory and the computer program instructions are configured, together with the at least two processors, to cause the electronic device to: in response to receiving, at a first processor, a write request from a host for writing user data to the storage system, cache the user data in a first cache of the first processor, and generate cache metadata in the first cache, the cache metadata including information associated with writing the user data to the storage system; send the user data and the cache metadata to a second cache of a second processor, for the second processor to perform, in the second cache, data processing related to cache mirroring; and send, to the host, an indication of completion of the write request, without waiting for the second processor to complete the data processing.

In a fourth aspect of the present disclosure, there is provided an electronic device. The electronic device includes at least two processors and at least one memory storing computer program instructions. The at least one memory and the computer program instructions are configured, together with the at least two processors, to cause the electronic device to: receive, at a second processor, user data and cache metadata from a first cache of a first processor, the cache metadata including information associated with writing the user data to the storage system; preprocess the cache metadata, such that the user data is accessible to a host via the second processor; and perform, in a second cache of the second processor, data processing related to cache mirroring based on the user data and the cache metadata.

In a fifth aspect of the present disclosure, there is provided a computer program product. The computer program product is tangibly stored on a non-volatile computer-readable medium and includes machine-executable instructions which, when executed, cause a machine to perform steps of the method according to the first aspect.

In a sixth aspect of the present disclosure, there is provided a computer program product. The computer program product is tangibly stored on a non-volatile computer-readable medium and includes machine-executable instructions which, when executed, cause a machine to perform steps of the method according to the second aspect.

It would be appreciated that this Summary is not intended to identify key features or essential features of the claimed subject matter, nor is it intended to be used to limit the scope of the claimed subject matter. Other features of the present disclosure will be made apparent by the following description.

BRIEF DESCRIPTION OF THE DRAWINGS

Through the following detailed description with reference to the accompanying drawings, the above and other objectives, features, and advantages of example embodiments of the present disclosure will become more apparent. Several example embodiments of the present disclosure will be illustrated by way of example but not limitation in the drawings in which.

Throughout the drawings, the same or similar reference symbols refer to the same or similar elements.

DETAILED DESCRIPTION OF EMBODIMENTS

Figure 1:
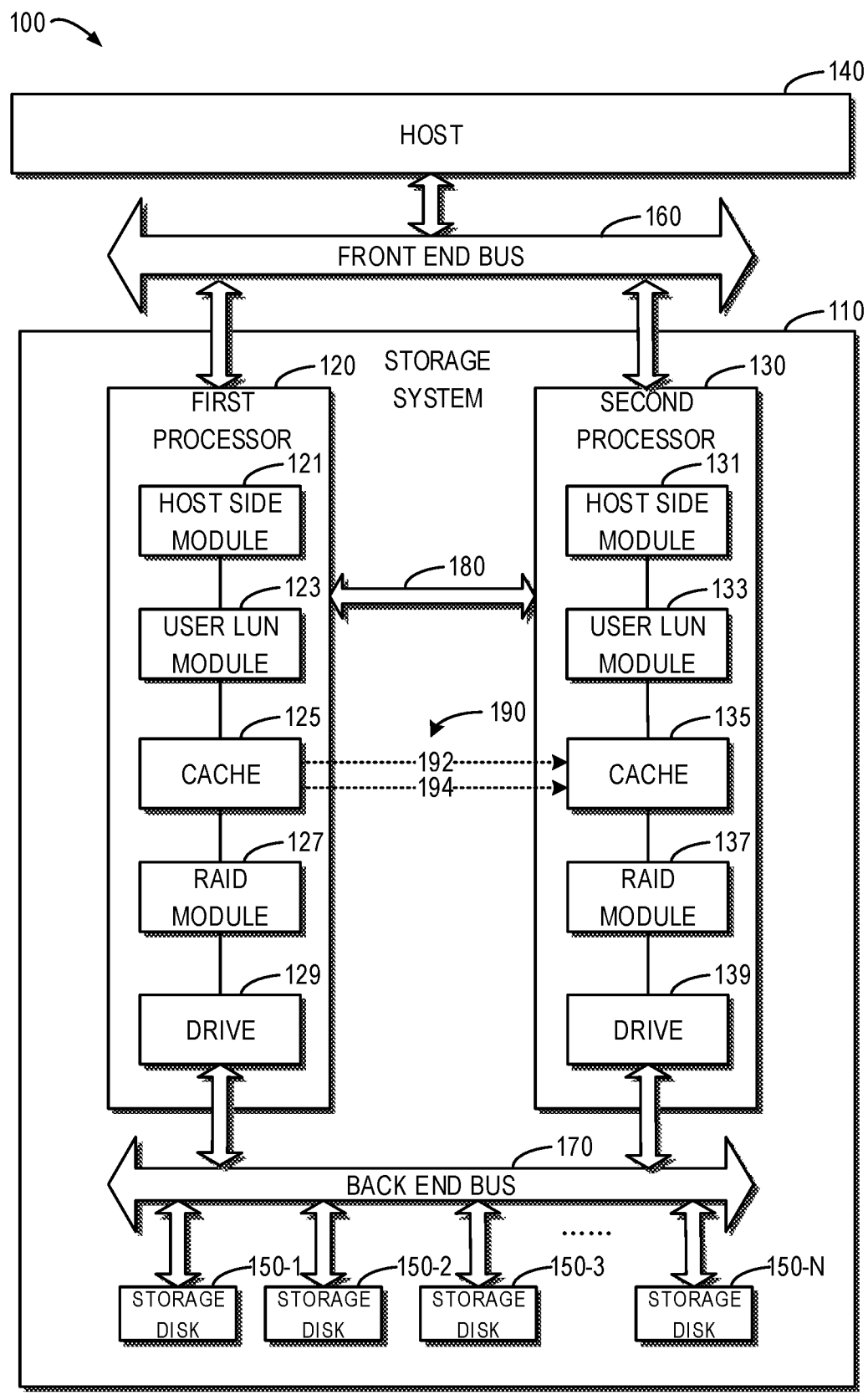
FIG. 1 illustrates a schematic block diagram of an example environment in which an embodiment of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles and spirits of the present disclosure will now be described with reference to several example embodiments illustrated in the drawings. It should be appreciated that description of those embodiments is merely to enable those skilled in the art to better understand and further implement example embodiments disclosed herein and is not intended to limit the scope disclosed herein in any manner.

FIG. 1 illustrates a schematic diagram of an example environment 100 in which an embodiment of the present disclosure can be implemented. As shown in FIG. 1, the example environment 100 includes therein a storage system 110 and a host 140. The host 140 may access or manage the storage system 110 via a front end bus 160. In some embodiments, the storage system 110 is a dual processor storage system which includes a first processor 120 and a second processor 130. Each processor may include different functional modules, for providing different storage services in the storage system 110. In other embodiments, the storage system 110 may also include more than two processors.

In an example as shown in FIG. 1, the first processor 120 includes a host side module 121, a user logical unit number (LUN) module 123, a cache (for example, DRAM cache) 125, a redundant arrays of independent disks (RAID) module 127, and a driver 129. The module 121 at a host side is used, for example, to interact with the host 140, the user LUN module 123 is used, for example, to provide a service associated with a user LUN, the cache 125 is used, for example, to provide data cache service, the RAID module 127 is used, for example, to provide a service associated with the RAID, and the driver 129 is used, for example, to implement access to physical storage disks 150-1 to 150-N by a back end bus 170. Hereinafter, the storage disks 150-1 to 150-N may also be referred to as storage disks 150 collectively.

Correspondingly, the second processor 130 includes a host side module 131, a user LUN module 133, a cache 135, a RAID module 137, and a driver 139. These functional modules of the second processor 130 have the same or similar functions as the corresponding functional modules of the first processor 120, which are omitted herein. The corresponding functional modules of the first processor 120 and the second processor 130 may communicate via a communication channel 180 (for example, communication manager interface (CMI)).

For example, user data 192 that a user writes from the host 140 to the storage system 110 via the first processor 120 may be cached temporarily in the cache 120 by the first processor 120, and then flushed to the storage disks 150 at the back end later. As such, the first processor 120 may generate cache metadata 194 in the cache 125, which includes information associated with writing the user data to the storage system 110. In the context of the present disclosure, the user data 192 and the cache metadata 194 may be referred to as cache data 190 collectively. In order to achieve data synchronization between the cache 125 and the cache 135, the first processor 120 may mirror the cache data 190 in the cache 125 to the cache 135 of the second processor 130 (for example, via a communication channel 180).

It would be appreciated that, although FIG. 1 by way of example illustrates various components and functional modules in the storage system 110, as well as connection relation and interaction relation between them, these components and functional modules and various relations between them are provided only as examples, without intention of limiting the scope of the present disclosure in any manner. In other embodiments, the storage system 110 can include more or fewer components and functional modules suitable for implementing embodiments of the present disclosure, and the components and functional modules may be in different connection relations and interaction relations suitable for implementing embodiments of the present disclosure.

As described above, there are still a lot of problems existed in data mirroring operation between two processors in a conventional dual processor storage system, for example, for a complicated flow of response, overlong latency, poor performance of an I/O request (in particular, a write request) sent by a host and the like. This causes that the conventional dual processor storage system cannot satisfy users' demands in many scenarios, resulting in poor user experience.

Specifically, according to the conventional solution, when a host writes user data to a storage system, following various operations may be included. For example, the host sends a write request and user data to the storage system. At a storage system side, after receiving the write request, the module at host side forwards the request to a module at a lower level, namely a user LUN module. Subsequently, the user LUN module writes the user data into cache when processing the write request.

After the user data is written into the cache, the cache mirrors the user data to a peer processor and then sends the cache metadata to the peer processor. Upon receiving the user data and cache metadata, the peer processor processes the cache metadata and adds the user data to a peer cache. Subsequent to completion of data processing, the peer processor returns an acknowledgement to the local processor.

After the user data is written into the local cache and the peer cache, the cache and the user LUN module of the local processor return an indication on completion of write to an upper level. When the module at host side receives the indication on completion from the lower level, the module at the host side sends a response of completion of the write request to the host. In addition, the user data (dirty data) having been written to the cache is flushed to storage disks at back end at an appropriate time determined by flushing strategy. A composition of latency of processing a write request by a conventional dual processor storage system will be analyzed below in detail with reference to FIGS. 2 and 3.

Figure 2:
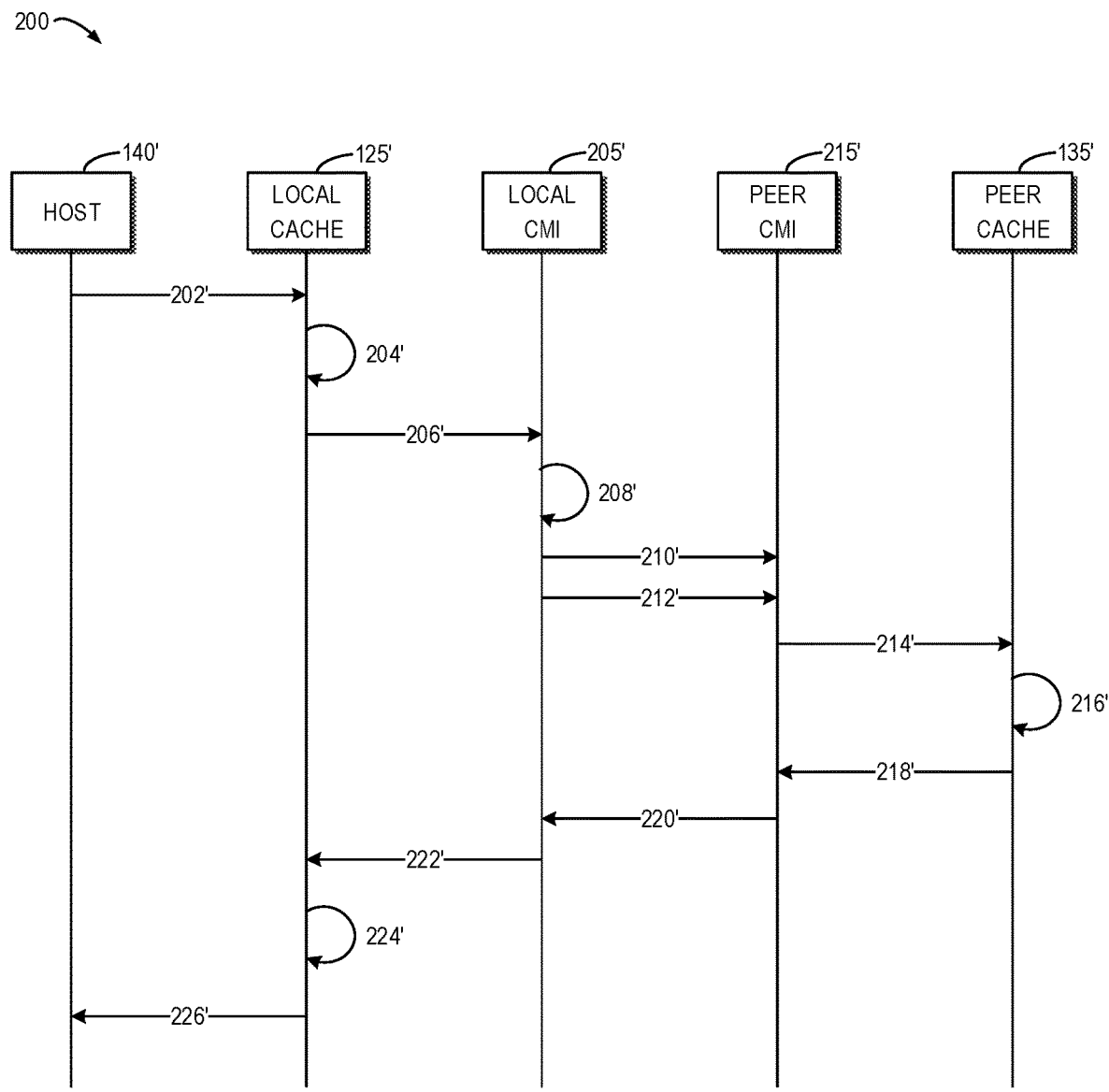
FIG. 2 illustrates a sequence diagram of processing write requests in a conventional dual processor storage system.

FIG. 2 illustrates a sequence diagram 200 of processing a write request by a conventional dual processor storage system. As shown in FIG. 2, the host 140' sends 202' a write request to a local cache 125'. The local cache 125' writes 204' the user data of the write request to a local physical page. The local cache 125' provides, to the local CMI 205', cache data for mirroring. The local CMI 205' starts 208' mirroring of the cache data. The local CMI 205' sends 210' the user data to a peer CMI 215'. The local CMI 205' sends 212' the cache data to the peer CMI 215'. The peer CMI 215' notifies 214' a peer cache 135' that the cache data is received.

In response to this, the peer cache 135' processes 216' the cache data. The peer cache 135' notifies 218' the peer CMI 215' that processing of the cache data has been completed. Thereafter, the peer CMI 215' returns 220' an acknowledgement message to the local CMI 205'. The local CMI 205' then notifies 222' the local cache 125' of completion of mirroring of the cache data. In response to this, the local cache 125' processes 224' the cache data. Subsequently, the local cache 125' sends 226' a response of completion of the write request to the host 140'. According to the processing sequence of the example process 200, the composition of latency of processing a write request by the conventional dual processor storage system can be obtained, which will be described below in detail with reference to FIG. 3.

Figure 3:
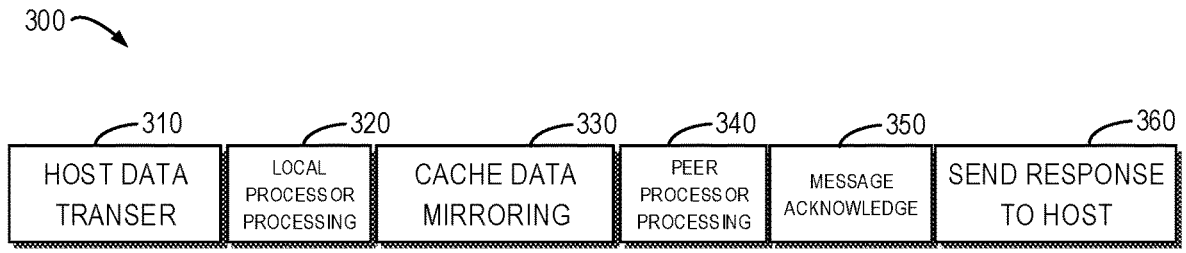
FIG. 3 illustrates a diagram of composition of latency of processing a write request in a conventional dual processor storage system.

FIG. 3 illustrates a schematic diagram of composition of latency 300 of processing a write request by a conventional dual processor storage system. As shown, the composition of latency 300 includes six portions which are host data transfer 310, local processor processing 320, cache data mirroring 330, peer processor processing 340, message acknowledging 350 and sending a response to a host 360. In these portions, the local processor processing 320 and the peer processor processing 340 is time of the processor performing processing, the host data transfer 310 and sending a response to the host 360 is time of data transfer at the front end bus and the back end bus, and the cache data mirroring 330 and the message acknowledging 350 are time of data transfer over an internal communication channel between two processors.

The inventors find that, in a general storage system, the data transfer over the internal communication channel between two processors often becomes a bottleneck of performance. One reason is that the internal communication channel has long transfer latency as compared to processing speed of CPU. Due to long latency of transfer of the internal channel, a deeper depth of I/O queue is probably required to achieve a wide transfer bandwidth and a high utilization rate of CPU. Therefore, if the latency of data transfer of the communication channel between two processors can be reduced, the performance of the storage system can be improved accordingly. Moreover, after a processor of sender sends cache data to a processor of receiver, user data and cache metadata have been stored in the cache of the processor of the receiver, and thus, there is a probability of reducing latency in handling of I/O request.

In view of the above problem and other potential problems of the conventional solution, and through the above analysis of the inventors, the embodiments of the present disclosure provide a method, an electronic device and a computer program for reducing latency of mirroring cache data in I/O handling. The basic idea of the embodiments of the present disclosure is that, when mirroring cache data is perform between two processors of a storage system, a processor of sender of cache data determines completion of mirroring the cache data after sending the cache data to a processor of receiver, without waiting for an acknowledgement on completion of the cache data processing received from the receiving processor. The embodiments of the present disclosure can reduce latency of mirroring cache data on I/O handling path, and can particularly shorten length of I/O handling path of write request, reduce latency in I/O handling of write request, and thus improving performance of the storage system.

In some embodiments of the present disclosure, prior to handle I/O requests, the processor preprocesses cache metadata that has arrived. In this way, it ensures that the I/O requests can be processed according to their arrival sequence, thereby protecting consistency data of the storage system. In addition, in a case that the storage system is recovered from a failure (software or power supply failure); the storage system will recover all cache metadata that has arrived at the processor of the receiver. In this way, it ensures that all data that has been written into cache of either processor of the storage system can be recovered, thereby avoiding data loss after system breakdown. Embodiments of the present disclosure will be described below in detail with reference to FIGS. 4 to 14.

Figure 4:
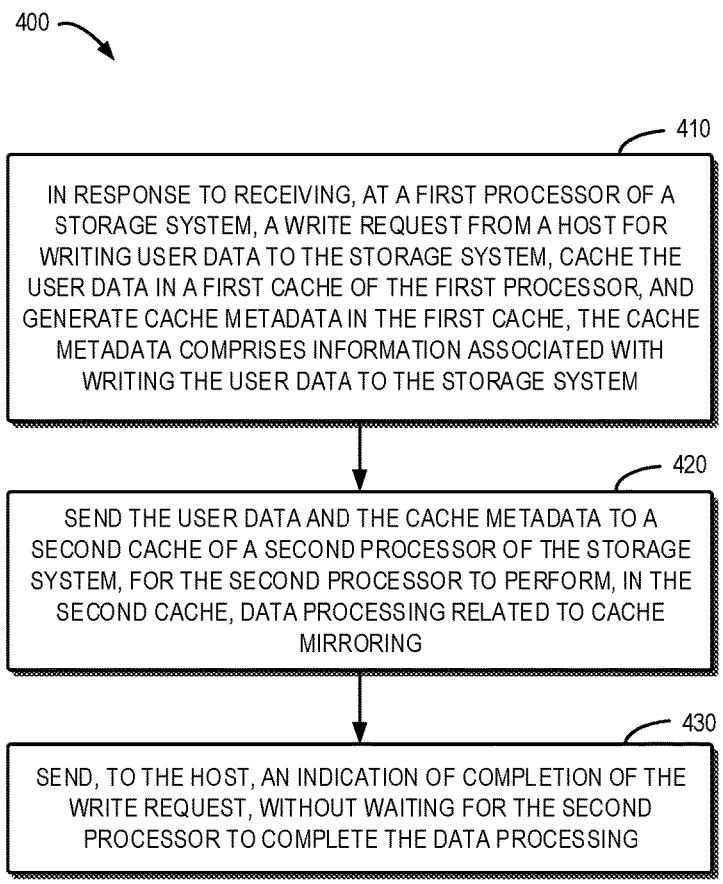
FIG. 4 illustrates a flowchart of a storage management method according to an embodiment of the present disclosure.

FIG. 4 illustrates a flowchart of a storage management method 400 according to an embodiment of the present disclosure. In some embodiments, the method 400 can be implemented by the storage system 110 in the example environment 100, for example, the method 400 can be implemented by a processor (for example, the first processor 120) or a processing unit of the storage system 110, or various functional modules of the storage system 110. For ease of discussion, the method 400 will be discussed below by taking the method 400 implemented by the first processor 120 of the storage system 110 as an example with the reference to FIG. 1. However, it would be appreciated that, in other embodiments, the method 400 may also be implemented by the second processor 130 of the storage system 110, or other electronic device or computer device independent of the example environment 100.

At 410, in response to receiving, from the host 140, a write request for writing user data 192 to the storage system 110, the first processor 120 of the storage system 110 caches the user data 192 to the cache 125. In addition, the first processor 120 generates cache metadata 194 in the cache 125. The cache metadata 194 includes information associated with writing the user data 192 to the storage system 110. For example, the cache metadata 194 may include cache page information, physical page information, address information, and the like, for writing the user data 192 to the storage system 110. In other embodiments, the cache metadata 194 may include any information for writing the user data 192 to the storage system 110.

At 420, the first processor 120 sends the user data 192 and the cache metadata 194 to the cache 135 of the second processor 130 of the storage system 110, for the second processor 130 to perform, in the cache 135, data processing related to cache mirroring. In some embodiments, the data processing performed by the second processor 130 may include determining a cache page indicated by the cache metadata 194, adding the physical page stored by the user data 192 to the determined cache page, and the like. In other embodiments, the data processing performed by the second processor 130 may also include any processing associated with mirroring of cache data.

It would be appreciated that the first processor 120 may send the user data 192 and the cache metadata 194 to the second processor 130 in any appropriate manner. For example, the first processor 120 may, for example, send the user data 192 and the cache metadata 194 together in one message to the second processor 130. Alternatively, the first processor 120 may send the user data 192 and the cache metadata 194 to the second processor 130, separately, and thus different ways of sending may be employed according to different properties of the user data 192 and the cache metadata 194. The embodiment will be described below in detail with reference to FIG. 5.

Figure 5:
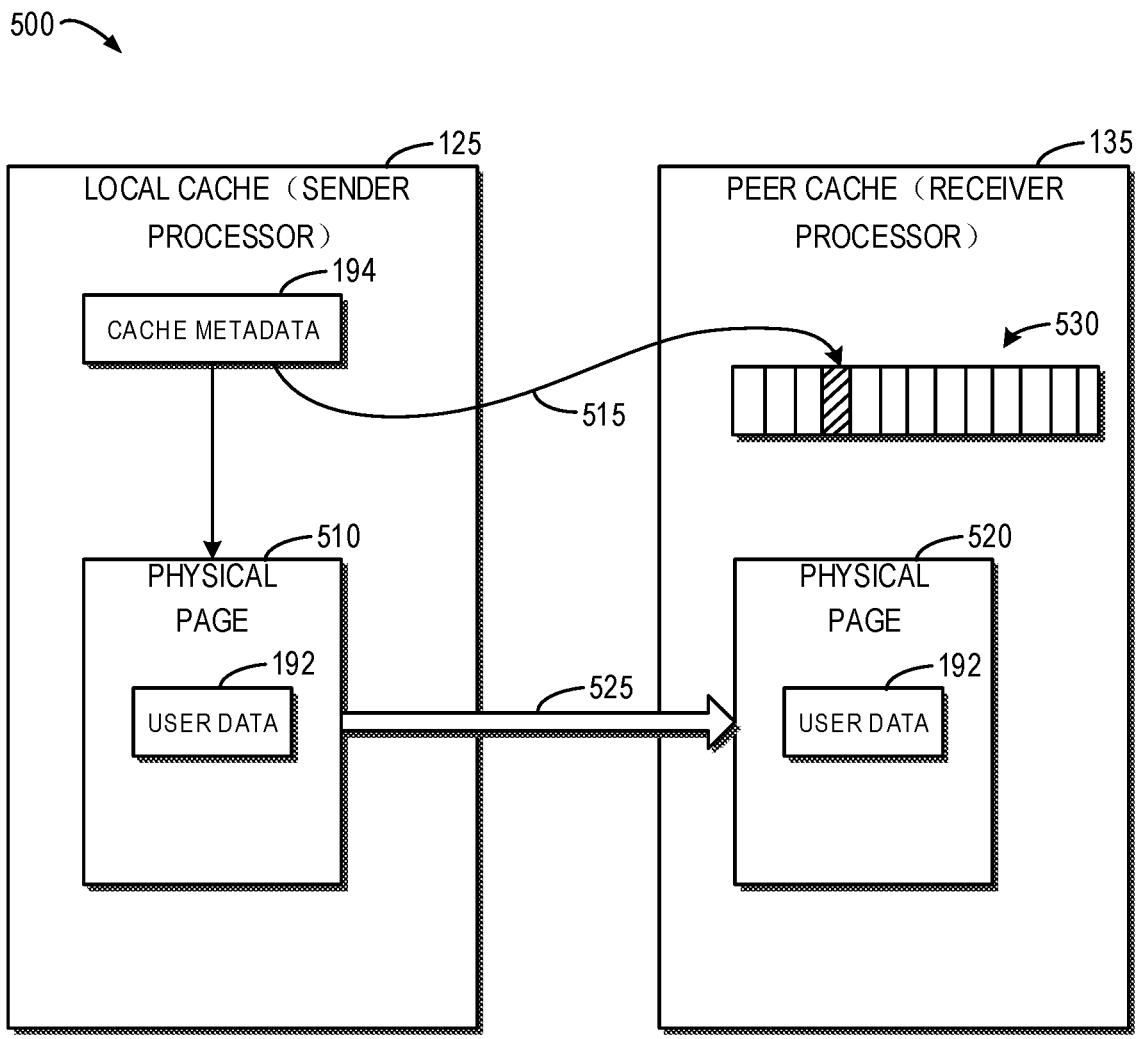
FIG. 5 illustrates a schematic diagram of sending cache data by a sending processor according to an embodiment of the present disclosure.

FIG. 5 illustrates a diagram 500 of sending cache data 190 by a sending processor 120 according to an embodiment of the present disclosure. As shown, the first processor 120 may cache the user data 192 in the physical page 510 of the cache 125, and generate cache metadata 194 related to the user data 192. In this case, when the cache data 190 is sent to the peer cache 135, the first processor 120 may transfer 525 the user data 192 from a physical page 510 of the cache 125 to a physical page 520 of the cache 135. For example, the transfer 525 of the user data 192 may be performed in a manner of direct memory access (DMA). On the other hand, the first processor 120 transfer 515 the cache metadata 194 to a receiving buffer 530 of the cache 135. In some embodiments, the receiving buffer 530 may be implemented by a ring buffer. In this way, the user data 192 and the buffer metadata 194 are sent from the first processor 120 to the second processor 130 in different manners, thereby improving efficiency of data transmission.

In some embodiments, the first processor 120 may send the cache metadata 194 to the peer cache 130 by generating a cache data message, and can enable the cache metadata message recoverable. For this purpose, the first processor 120 may encapsulate the cache metadata 194 and recovery information into the cache metadata message, and the recovery information can be used for recovering the cache metadata message during failure recovery of the storage system 110, so as to enhance robustness and reliability of the storage system. Then, the first processor 120 may send the generated cache metadata message to the receiving buffer 530 of the peer cache 135. An example of the cache metadata message according to an embodiment of the present disclosure will be described below with reference to FIG. 6.

Figure 6:
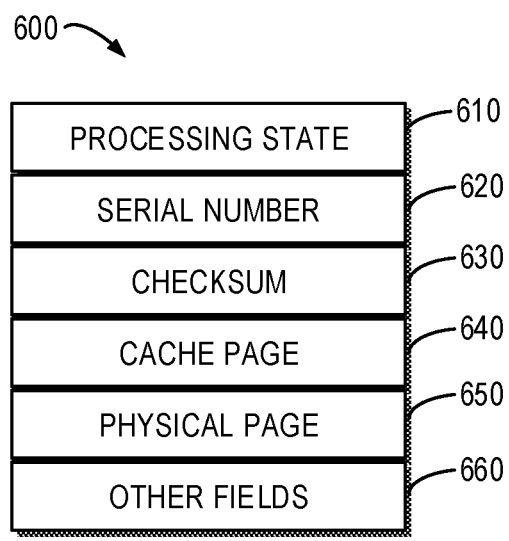
FIG. 6 illustrates a schematic diagram of an example cache metadata message according to an embodiment of the present disclosure.

FIG. 6 illustrates a diagram of an example cache metadata message 600 according to an embodiment of the present disclosure. As shown in FIG. 6, the cache metadata message 600 may include a plurality of fields, such as a processing state 610, a sending serial number 620, a checksum 630, a cache page 640, a physical page 650 and other field 660. In these fields, the processing state 610, the sending serial number 620 and the checksum 630 are recovery information as mentioned above, which can be used for recovering the cache metadata message 600. In other embodiments, the recovery message may also include more or fewer fields, or include fields being capable of recovering the cache metadata message 600, different from the fields listed above. Moreover, the other field 660 may include one or more fields in the conventional cache metadata message.

In order to identify recovery information fields of the cache metadata message 600, prior to sending the cache metadata message 600 to the second processor 130, the first processor 120 may set the processing state 610 of the cache metadata message 600 to "valid," to indicate that the cache metadata message 600 has not been processed by the second processor 130. In addition, the first processor 120 may also set the sending serial number 620 of the cache metadata message 600. For example, whenever a cache metadata message is sent, the sending serial number may be increased progressively by a predetermined value, such as increase by 1. In some embodiments, when performing recovery of a plurality of cache metadata messages, the recovery may start orderly from the cache metadata message with a small sending serial number.

Further, the first processor 120 may also set the checksum 630 of the cache metadata message 600. The checksum 630 is used for protecting integrity of the cache metadata message 600, and thus will be verified when performing recovery of the cache metadata message 600. For example, the storage system 110 may break down when the cache metadata message 600 is being transferred. In this case, it is probably that only a portion of the cache metadata message 660 is transferred, and the checksum 630 is not matched at this time. The example composition of the cache metadata message 600 and setting of related fields by the first processor 120 as a sender have been introduced briefly above. Hereinafter, how the processing state 610 is set at the processor of receiver 130 and the example recovery process of the cache metadata message 600 will be described in detail with reference to FIG. 12.

Returning to FIG. 4, at 430, the first processor 120 sends an indication on completion of a write request to the host 140, without waiting for the second processor 130 to complete data processing for the cache data 190. In this way, the latency of responding to the write request sent by the first processor 120 to the host 140 includes neither duration of mirroring processing to the cache data 190 performed by the second processor 130, nor duration of transmitting an acknowledgement message from the second processor 130 to the first processor 120, thereby shortening the length of I/O handling path of write request, reducing latency in I/O handling of the write request, and improving the performance of the storage system. Some embodiments of the present disclosure have been described from an angle of processor of sender, and embodiments of the present disclosure will be further described from an angle of processor of receiver with reference to FIGS. 7 to 11.

Figure 7:
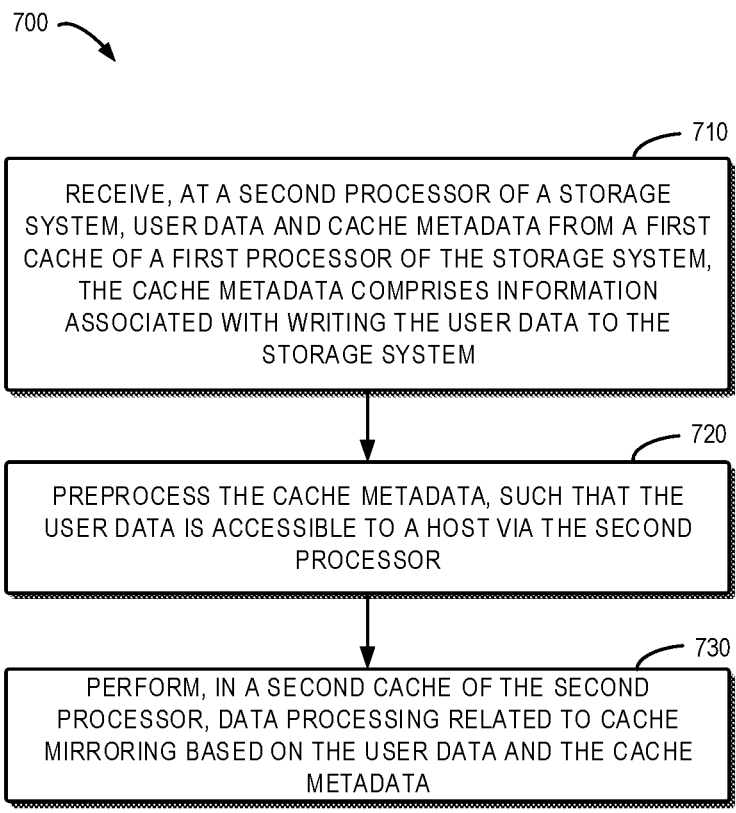
FIG. 7 illustrates a flowchart of a storage management method according to another embodiment of the present disclosure.

FIG. 7 illustrates a flowchart of a storage management method 700 according to a further embodiment of the present disclosure. In some embodiments, the method 700 can be implemented by the storage system 110 in the example environment 100, for example, the method 700 can be implemented by the processor (for example, the second processor 130) of the storage system 110, or various functional modules of the storage system 110. For ease of discussion, the method 700 will be discussed below, by taking the method 700 implemented by the second processor 130 of the storage system 110 as an example, with reference to FIG. 1. However, it would be appreciated that, in other embodiments, the method 700 may also be implemented by the first processor 120 of the storage system 110, or other electronic device or computer device independent of the example environment 100.

At 710, the second processor 130 of the storage system 110 receives user data 192 and cache metadata 194 from the cache 125 of the first processor 120. As indicated above, the cache metadata 194 include the information associated with writing the user data 192 into the storage system 110. For example, the cache metadata 194 may include cache page information, physical page information, address information and the like, for writing the user data 192 into the storage system 110. In other embodiments, the cache metadata 194 may include any information for writing the user data 192 into the storage system 110.

It would be appreciated that the second processor 130 may receive the user data 192 and the cache metadata 194 in any appropriate manner. For example, the second processor 130 may, for example, receive the user data 192 and the cache metadata 194 together in one message. Alternatively, the first processor 120 may receive the user data 192 and the cache metadata 194, separately. For example, in the example as illustrated in FIG. 5, when the user data 192 and the cache metadata 194 are being received, the user data 192 may be transferred from the physical page 510 of the cache 125 to the physical page 520 of the cache 135 of the second processor 130. In addition, the second processor 130 may buffer the received cache metadata 194 to the receiving buffer 530 of the cache 135.

At 720, the second processor 130 preprocesses the cache metadata 194, such that the user data 192 is accessible to the host 140 via the second processor 130. In this way, the second processor 130 may enable the host 140 to access the user data 192 more rapidly via the second processor 130. For example, when the cache metadata 194 is buffered in the buffer 530 of the cache 135, the host 140 may be unable to access the user data via the second processor 130. Moreover, since the second processor 130 is required to process the cache metadata sequentially according to the arrival sequence thereof, it probably that the cache metadata 194 may be buffered in the cache area 530 for a long time, such that the host 140 cannot access the user data 192 via the second processor 130 for a long time, and at this time, the host 140 probably has received a response of success of the write request from the first processor 120.

In order to solve this problem, the second processor 130 may simply preprocess the cache metadata 194, such that the user data 192 become accessible to the host 140 at the second processor 130. It would be appreciated that the second processor 130 may perform the preprocessing in any appropriate manner, so long as the preprocessing enables the host 140 to access the user data 192 at the second processor 130. For example, the second processor 130 may move the cache metadata 194 from the receiving buffer 530 to a queue of cache metadata accessible to the host 140.

In other words, in order to shorten the latency in sending the user data 194 to the second processor until the user data 194 become accessible, the entire procedure of processing the cache metadata 194 by the second processor 130 are divided into two portions (or stages), in the embodiment of the present disclosure. The first portion is a preprocessing stage, causing the user data 192 to become accessible. The second portion includes actual processing of mirroring cache data 190, which may be referred to as data processing stage in the context. Further description will be provided below with reference to FIG. 8.

Figure 8:
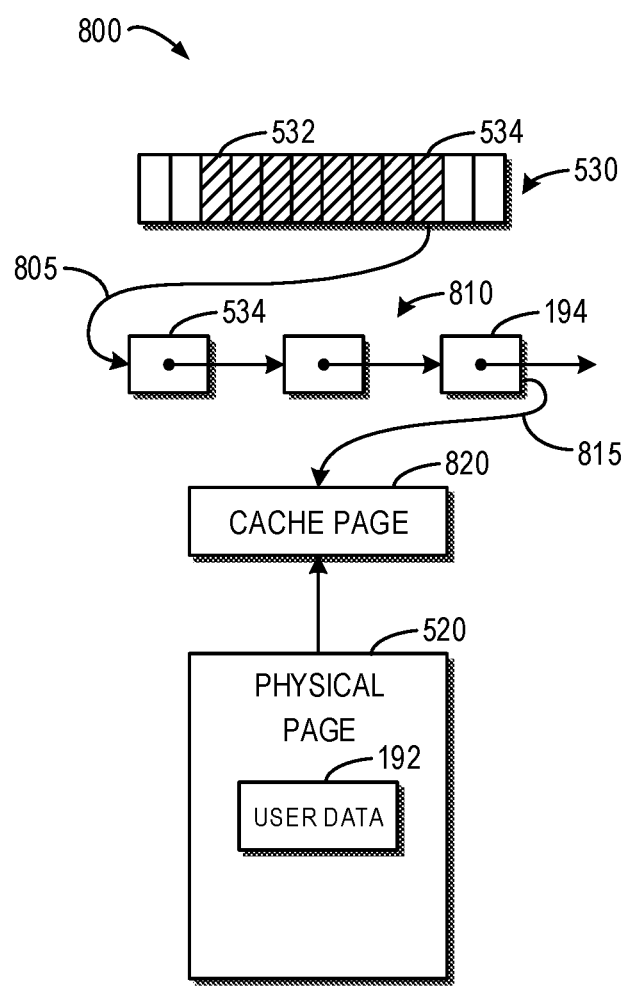
FIG. 8 illustrates a diagram of processing cache data by a receiving processor according to an embodiment of the present disclosure.

FIG. 8 illustrates a diagram 800 of processing cache data 190 by the receiving processor 130 according to an embodiment of the present disclosure. As shown, processing of the cache data 190 by the second processor 130 may be divided into two stages. The first stage 805 may be referred to as preprocessing stage, which may be implemented by front end threads. At the preprocessing stage 805, the second processor 130 may attempt to lock the associated cache page for the cache metadata 534 to be processed in the receiving buffer 530, and move the cache metadata 534 to be processed out of the receiving buffer 530 and arrange the same into a queue 810 of cache metadata to be processed, for example, at the head of the queue 810. In some embodiments, the receiving buffer 530 may be a ring buffer, the buffer metadata 532 may be the head of the ring buffer, and the cache metadata 534 may be the tail of the ring buffer.

The second stage 815 may be referred to as data processing phase, which may be implemented by background thread. Hence, in some embodiments, the second processor 130 may wake up a background thread to perform data processing for the cache data 190. In this manner, the front end threads may be free of performing complicated data processing for the cache metadata, thereby accelerating the speed of the front end threads for processing the cache metadata and reducing latency in responding to I/O requests from the host. Meanwhile, the complicated data processing for the cache metadata may be transfer to the background thread for processing, and thus does not affect the latency in responding to I/O requests anymore.

At the data processing stage 815, the second processor 130 may process the cache metadata 194 located, for example, at the tail of the queue 810, and add the physical page 520 associated with the cache metadata 194 to a cache page 820 indicated by the cache metadata 194, so as to implement an association between the user data 192 in the cache 135 and the cache metadata 194. In other embodiments, the data processing stage 815 may also include other possible processing associated with cache mirroring. The preprocessing stage 805 and the data processing stage 815 will be described below in detail with referent to FIGS. 9 and 10, respectively.

Figure 9:
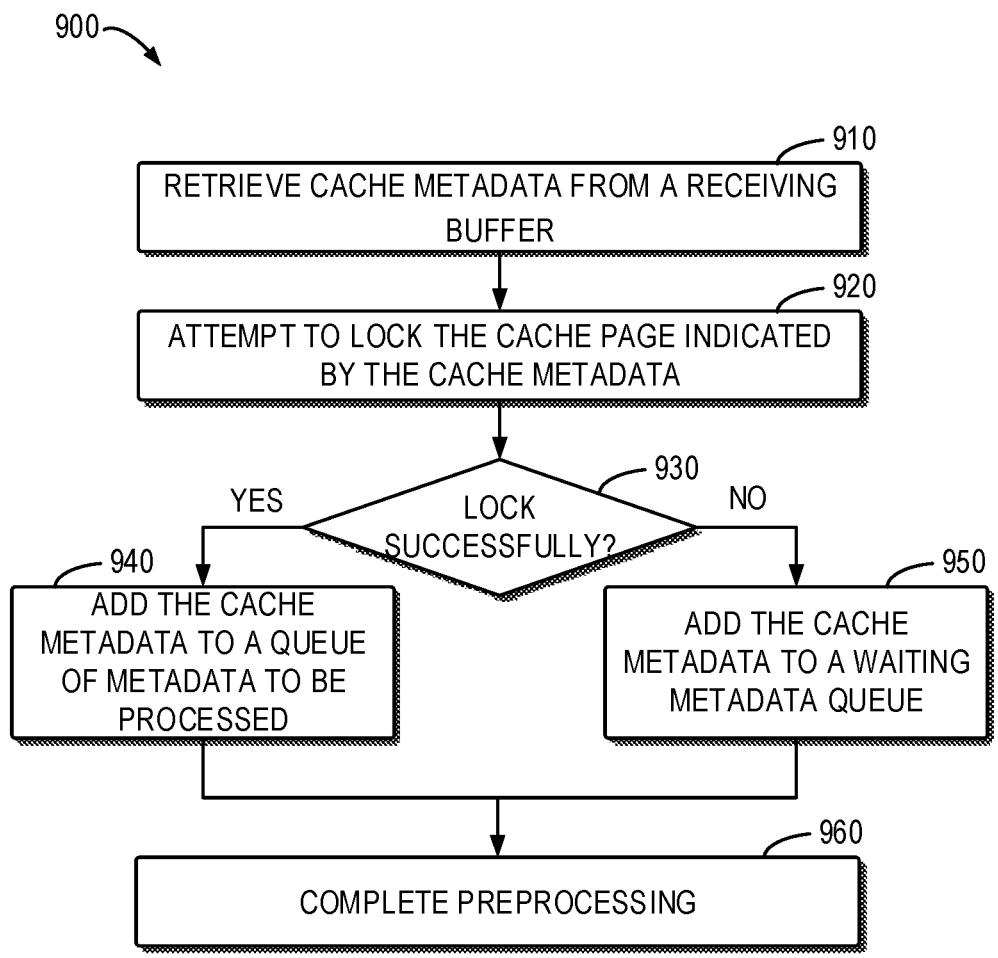
FIG. 9 illustrates a flowchart of an example process of preprocessing cache data by a receiving processor according to an embodiment of the present disclosure.

FIG. 9 illustrates a flowchart of an example process 900 of preprocessing the cache metadata 194 by the receiving processor 130 according to an embodiment of the present disclosure. For ease of discussion, hereinafter, the process 900 will be discussed below with reference to FIG. 1 by taking a process 900 implemented by the second processor 130 of the storage system 110 as an example. However, it would be appreciated that, in other embodiments, the process 900 may also be implemented by the first processor 120 of the storage system 110, or other electronic device or computer device independent of the example environment 100.

At 910, the second processor 130 retrieves the cache metadata from the receiving buffer. For example, the second processor 130 may retrieve the cache metadata from the tail of the ring buffer. At 920, the second processor 130 attempts to lock the cache page indicated by the cache metadata. At 930, the second processor 130 determines whether the cache page is locked successfully. If the cache page is locked successfully, the process 900 moves to 940. On the other hand, if the cache page is not locked successfully, the process 900 moves to 950. At 940, the second processor 130 adds the cache metadata into the queue of metadata to be processed, to wait for processing by the second processor 130. At 950, the second processor 130 adds the cache metadata into the waiting metadata queue, to wait for the second processor 130 to lock the cache page 820 for the cache metadata 194. At 960, the second processor 130 ends preprocessing.

It can be obtained from the process 900 that, if there are other I/O requests from the host 140 for requesting for performing read operations or write operations for the same cache page, an early I/O request will lock the cache page successfully while a late I/O request will be unable to lock the cache page. The I/O request failing to lock the cache page will be added to a waiting queue of the cache page. In this way, the I/O requests are processed sequentially according to their arrival sequence.

Moreover, once the cache metadata is added to the waiting queue, the cache metadata should lock the cache page successfully and will be waked up and processed at the background. If the cache metadata fail to lock the cache page, they will be added to the waiting queue of the cache page and will only be waked up until the cache page is released by the preceding I/O request.

Returning to FIG. 7, at 730, the second processor 130 performs, in the cache 135, data processing related to cache mirroring based on the user data 192 and the cache metadata 194. In some embodiments, the data processing may correspond to the data processing stage 815 as described above with reference to FIG. 8. For example, when performing the data processing, the second processor 130 may add the physical page 520 storing the user data 192 into the cache page 820 indicated by the cache metadata 194. In other embodiments, the data processing performed by the second processor 130 may also include any processing associated with the cache data mirroring, for example, determining the cache page indicated by the cache metadata 194, and the like. The example process of data processing related to cache mirroring performed by the second processor 130 will be described with reference to FIG. 10.

Figure 10:
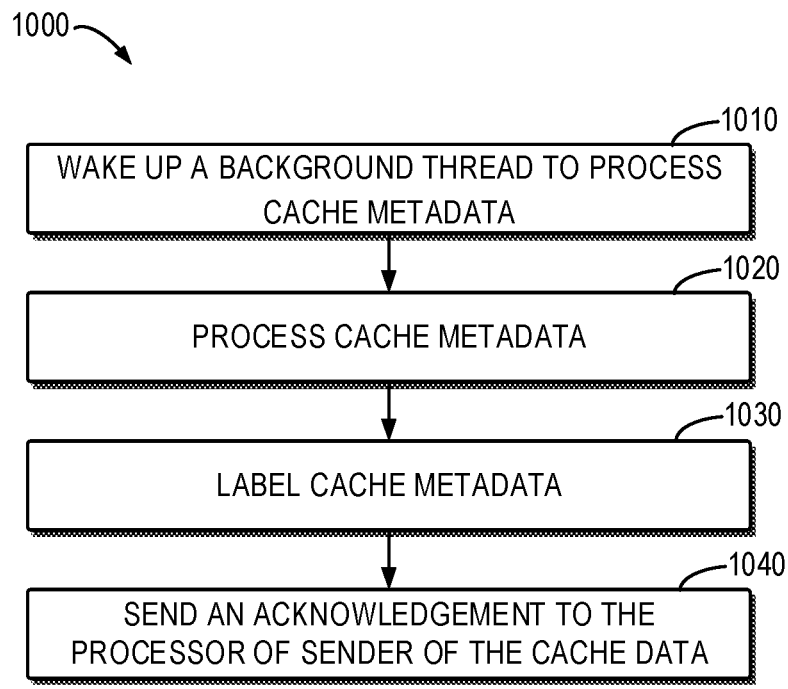
FIG. 10 illustrates a flowchart of an example process of performing data processing for cache metadata by a receiving processor according to an embodiment of the present disclosure.

FIG. 10 illustrates a flowchart of an example process 1000 of performing data processing for the cache metadata 194 by the receiving processor 130 according to an embodiment of the present disclosure. For ease of discussion, hereinafter, the process 1000 will be discussed below with reference to FIG. 1 by taking the process 100 implemented by the second processor 130 of the storage 110 as an example. However, it would be appreciated that, in other embodiments, the process 1000 may also be implemented by the first processor 120 of the storage system 110, or other electronic device or computer device independent of the example environment 100.

At 1010, the second processor 130 wakes up a background thread to process the cache metadata. For example, the second processor 130 wakes up the background thread to process the cache metadata in the queue of the cache metadata to be processed, or the cache metadata in the waiting queue of cache metadata. At 1020, the second processor 130 processes the cache metadata. At 1030, the second processor 130 labels the cache metadata. For example, the processing state of the cache metadata that has been processed is changed to "invalid." In addition, the second processor 130 may also send a response message of completion of cache data mirroring to the first processor 120 via an internal communication channel. For example, the second processor 130 may perform calling CMI interface. At 1040, the second processor 130 sends an acknowledgement to the processor 120 of sender of the cache data. For example, the CMI interface called by the second processor 130 may perform sending the acknowledgement message to the first processor 120.

As described above, once the processor 120 of sender sends the cache data 190, the first processor 120 may indicate completion of write request to the host 140. This also means that, once the cache metadata 194 arrives at the processor 130 of receiver, the user data 192 has been written into the cache 135. In order to ensure that the I/O requests are processed sequentially according to the arrival sequence, the second processor 130 processes first the cache metadata 194 that has arrived, prior to handle other I/O requests from the host 140. Therefore, in some embodiments, in response to receiving an I/O request from the host 140, the second processor 130 preprocesses the cache metadata that has not been preprocessed. Subsequently, the second processor 130 processes the I/O request received from the host 140. This kind of embodiment will be described below in detail with reference to FIG. 11.

Figure 11:
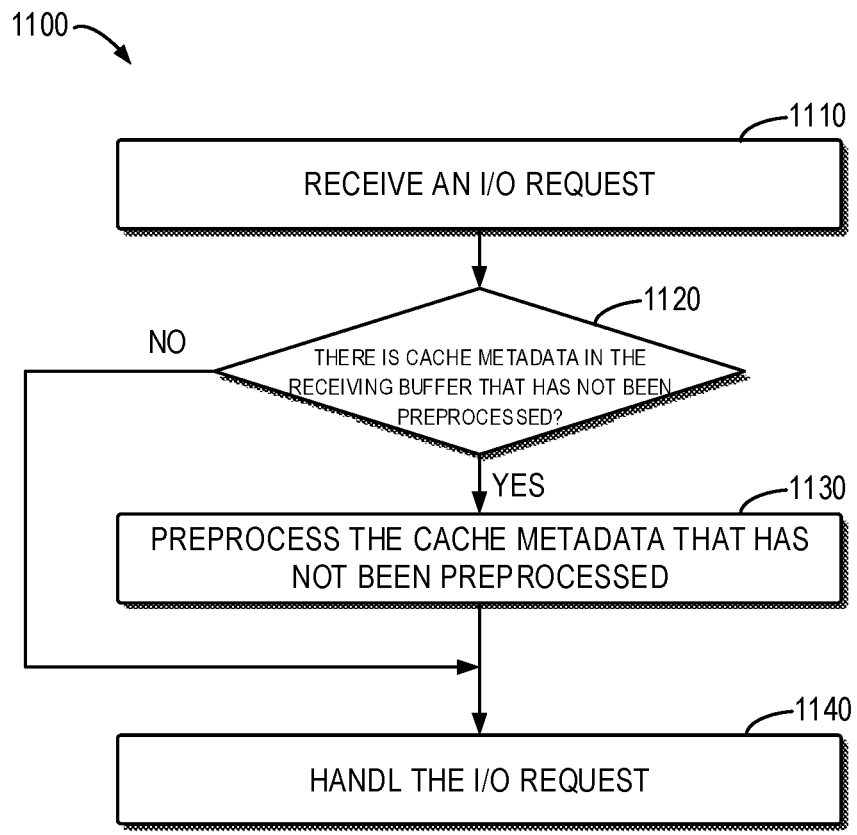
FIG. 11 illustrates a flowchart of an example process of performing I/O handling by a receiving processor according to an embodiment of the present disclosure.

FIG. 11 illustrates a flowchart of an example process 1100 of performing I/O handling by the receiving processor 130 according to an embodiment of the present disclosure. For ease of discussion, hereinafter, the process 1100 will be discussed below with reference to FIG. 1 by taking a process 1100 implemented by the second processor 130 of the storage system 110 as an example. However, it would be appreciated that, in other embodiments, the process 1100 may also be implemented by the first processor 120 of the storage system 110, or other electronic device or computing device independent of the example environment 100.

At 1110, the second processor 130 receives an I/O request from the host 140. In some embodiments, the I/O request may be a write request, a read request, or any other type of I/O request. At 1120, the second processor 130 determines whether there is cache metadata in the receiving buffer area that has not been preprocessed. If there is cache metadata that has not been preprocessed, the process 1100 moves to 1130. In contrast, if there are no cache metadata that has not been preprocessed, the process 1100 moves to 1140.

At 1130, the second processor 130 preprocesses the cache metadata that has not been preprocessed. For example, the preprocessing may include processing as described above with reference to FIG. 9. At 1140, after all the metadata that has not been preprocessed are preprocessed, the second processor 130 handles the received I/O request. If the I/O request is a write request, the second processor 130 may process the I/O request according to a flow of write request according to the embodiment of the present disclosure. If the I/O request is a read request, the second processor 130 may process the I/O request according to a flow of read request according to the embodiment of the present disclosure.

In addition, it would be noted that, during preprocessing to the cache metadata at 1130, the cache page indicated by the cache metadata will be locked. Therefore, at 1140, if the I/O request accesses the same cache page, the I/O request is unable to lock the cache page successfully. The I/O request has to wait until the cache page is locked successfully, i.e., wait for completion of back end processing of the previous cache metadata.

As can be known from the example process 1100, it will be advantageous that the second processor 130 preprocesses the cache metadata first prior to handle the I/O request. For example, as described above, the entire message processing flow of the conventional dual processor storage system for handling I/O requests probably takes a long time, while the message processing flow is divided into two stages according to the embodiment of the present disclosure. It is only required to lock the cache page at the first stage, which does not take a long time. More complicated data processing is pushed to the background thread. In addition, the cache page is locked in the preprocessing at the first stage, and a processing as such ensures that I/O requests for the same cache page can be processed according to the arrival sequence of the I/O requests.

In some embodiments of the present disclosure, in order to protect data integrity of the storage system, a persistent memory may be used in the conventional dual processor storage system to create the receiving buffer. Furthermore, during cache metadata processing, the cache metadata may be maintained before a physical page is added to a cache page. During a failure recovery of software or power supply, it is required to recover only the maintained cache metadata, while the other cache metadata sent to the receiving buffer is not recovered. In the conventional solution, it is rational not to recover the cache metadata in the receiving buffer because an I/O request response is returned to the host after the related cache metadata is processed.

In comparison, in the embodiments of the present disclosure, a response of the write request of the host 140 is returned to the host 140 after cache metadata arrives at the cache (for example, the buffer) of the processor of receiver. In this case, it is necessary to recover the cache metadata from the receiving buffer. For example, the receiving buffer is also created from the persistent memory, and it is required to recovery all the cache metadata that has not been preprocessed in the receiving buffer. Therefore, processing state of the cache metadata needs to be labelled. In order to perform such kind of recovery of the cache metadata, in some embodiments, the second processor 130 may receive, from the first processor 120, the cache metadata message 600 that includes the cache metadata 194 and the cache metadata message 600, and the recovery information can be used for recovering the cache metadata message 660 during a failure recovery.

When the processing state of the cache metadata is being labelled, in response to completion of preprocessing the cache metadata message 600, the second processor 130 may change the processing state 610 of the cache metadata message 600 from an initial value "valid" to "preprocessed." In response to data processing of the cache metadata message 600 being performed, the second processor 130 may set the processing state 610 to "processing". In response to completion of data processing of the cache metadata message 600, the second processor 130 may set the processing state 610 to "invalid."

When the storage system 110 is recovered from failure, the second processor 130 may recover the cache metadata message 600 based on the recovery information in the cache metadata message 600. For example, the second processor 130 may determine, based on the processing state 610 of the cache metadata message 600, that the cache metadata message 600 is required to be recovered. For another example, the second processor 130 may determine, based on the sending serial number 620 of the cache metadata message 600, a sequence of the cache metadata message 600 and a further recovered cache metadata message. For a further example, the second processor 130 may check integrity of the cache metadata message 600 based on the checksum 630 of the cache metadata message 600. The example process of recovering the cache metadata message 600 will be described below with reference to FIG. 12.

Figure 12:
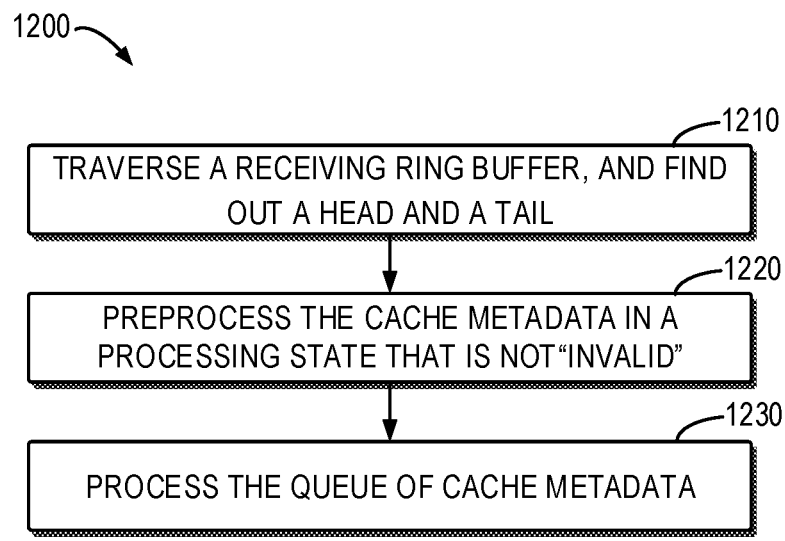
FIG. 12 illustrates a flowchart of an example process of recovering a cache metadata message according to an embodiment of the present disclosure.

FIG. 12 illustrates a flowchart of an example process 1200 of recovering the cache metadata message 600 according to an embodiment of the present disclosure. In some embodiments, the process 1200 may be implemented by the storage system 110 in the example environment 100, for example, the process 1200 may be implemented by the processor (for example, the second processor 130) or processing unit of the storage system 110, or various functional modules of the storage system 110. For ease of discussion, hereinafter, the process 1200 will be discussed below with reference to FIG. 1 by taking the process 1200 implemented by the second processor 130 of the storage system 110. However, it would be appreciated that, in other embodiments, the process 1200 may also be implemented by the first processor 120 of the storage system 110, or other electronic device or computing device independent of the example environment 100.

At 1210, the second processor 130 traverses the receiving buffer 530 (for example, the ring buffer), and finds the head and the tail of the ring buffer according to respective processing states and serial numbers of a plurality of cache metadata messages.

In some embodiments, as indicated above, it is required to recover only the cache metadata messages whose processing states is not "invalid". In these cache metadata messages, the cache metadata message at the tail of the ring buffer 530 has the minimum serial number, while the cache metadata message at the head of the ring buffer 530 has the maximum serial number.

At 1220, the second processor 130 performs, starting from the tail to the head of the ring buffer 530 to the head, preprocessing the cache metadata message that needs to be recovered, for example, attempting to lock the cache page indicated by cache metadata message, adding the cache metadata messages to a queue of cache metadata message, and the like. In some embodiments, prior to recovering the cache metadata message, the checksum of the metadata message may be verified first. If the checksum is not matched, it indicates that the cache metadata message is a message that is not delivered completely and thus may be discarded.

At 1230, the second processor 130 performs data processing for the metadata messages in the metadata message queue. For example, the data processing may include processing as described above with reference to blocks 1020-1040 in FIG. 10.

Figure 13:
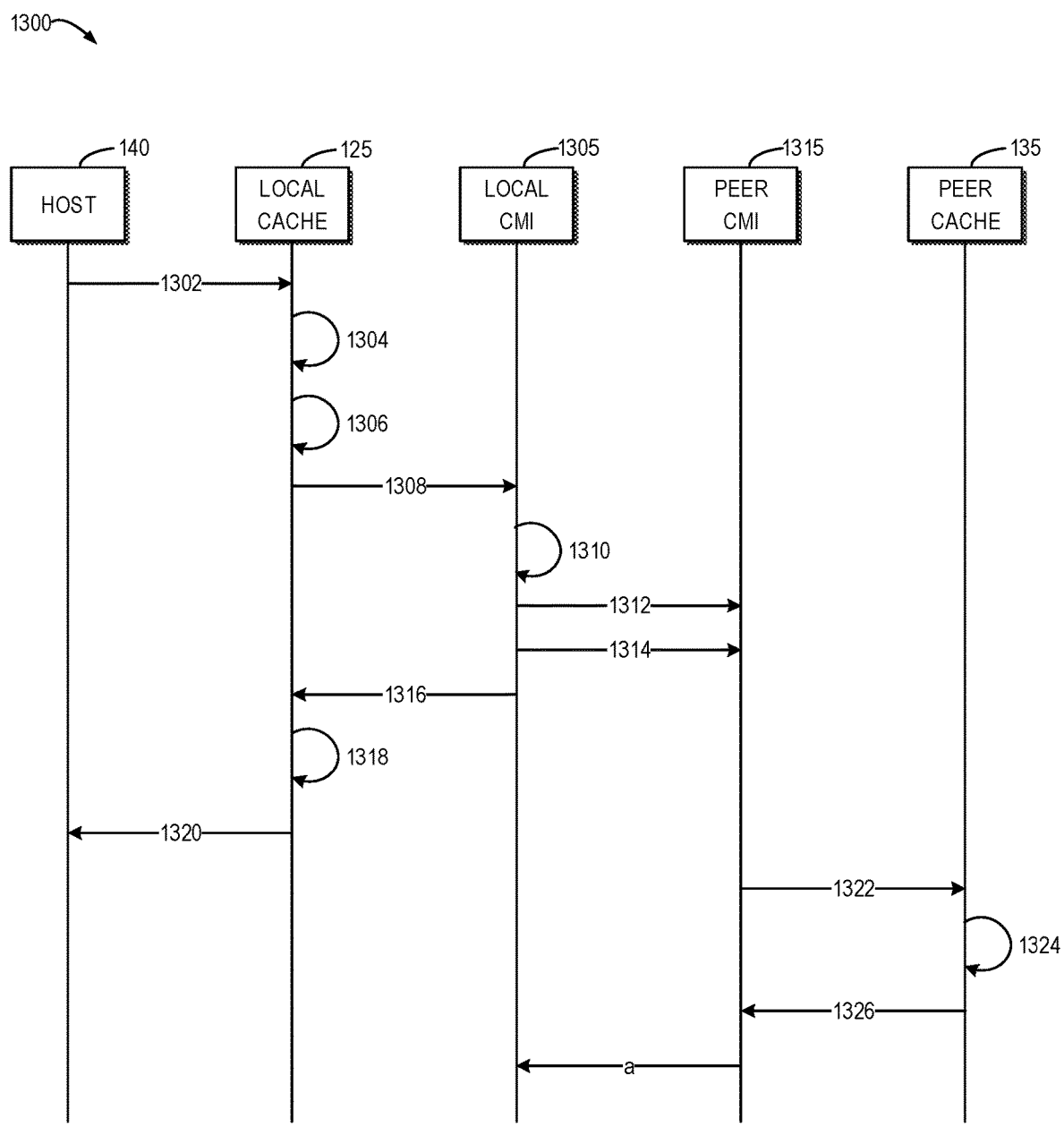
FIG. 13 illustrates a sequence diagram of an example process of processing a write request by a storage system according to an embodiment of the present disclosure.

FIG. 13 illustrates a sequence diagram of an example process 1300 of processing a write request by the storage system 110 according to an embodiment of the present disclosure. For ease of discussion, hereinafter, the process 1300 will be discussed below by taking the first processor 120 as a local processor and the second processor 130 as a peer processor as an example. However, it would be appreciated that, in other embodiments, the local processor may also be the first processor 120 or any other processor of the storage system 110, while the peer processor may also be the second processor 130 or any other processor of the storage system 110.

As shown in FIG. 13, the host 140 sends 1302 a write request to the first processor 120. The first processor 120 then determines whether there is cache metadata in the local cache 125 that has not been preprocessed. If yes, the local cache 125 preprocesses 1304 the cache metadata. Thereafter, the local cache 125 writes 1306 user data of the write request to the local physical page. Subsequently, the local cache 125 provides 1308 the user data and the cache metadata to a local CMI 351. Next, the local CMI 1305 starts mirroring of the cache data. The local CMI 1305 then sends 1312 (for example, via direct memory access (DMA)) the user data to the peer CMI 1315. In addition, the local CMI 1305 sends 1314 the cache metadata to the peer CMI 1315. Subsequently, the local CMI 1305 notifies 1316 the local cache 125 of completion of mirroring the cache data. In response to this, the local cache 125 adds 1318 the physical page having the user data into the cache page indicated by the cache metadata. The local cache 125 then sends 1320 a response of the write request to the host 140.

On the other hand, the peer CMI 1315 notifies 1322 the peer cache 135 that the cache data is received. In response to this, the peer cache 135 performs 1324 data processing for the cache metadata, and adds the mirrored user data to the cache page. Thereafter, the peer cache 135 notifies 1326 the peer CMI 1315 that processing the cache data has been completed. The peer CMI 1315 then returns an acknowledgement message to the local CMI 1305. According to the processing sequence of the example process 1300, the composition of latency for processing a write request according to an example solution of an embodiment of the present disclosure can be obtained. The detailed description will be provided below with reference to FIG. 14.

Figure 14:
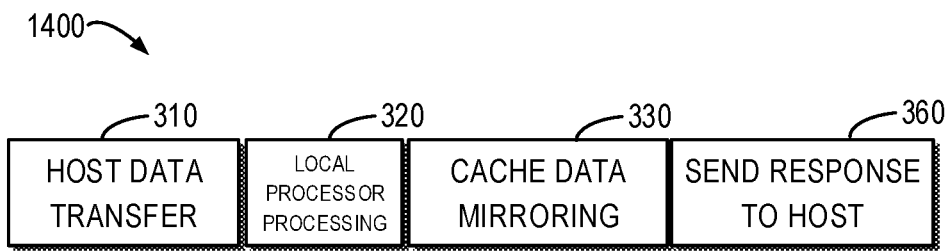
FIG. 14 illustrates a diagram of composition of latency of processing a write request by a storage system according to an embodiment of the present disclosure.

FIG. 14 illustrates a diagram of composition of latency 1400 for processing a write request by a storage system 110 according to an embodiment of the present disclosure. As shown in FIG. 14, different than the composition of latency 300 for processing a write request by the conventional storage system as shown in FIG. 3, composition of latency 1400 includes only four portions, namely host data transfer 310, local processor processing 320, cache data mirroring 330, and sending 360 a response to the host. In other words, the composition of latency 1400 does not include peer processor processing 340 and message acknowledging 350 anymore. Therefore, as compared with the conventional write request processing flow, the embodiment of the present disclosure reduces latency of mirroring the cache data on the I/O handling path, shortens the I/O handling path of the host, and reduces the I/O response latency.

In addition, according to equation TOPS (input output operations per seconds)=queue depth/response time, less response time brings about a higher TOPS in the case of the same queue depth, which means that the less response time brings about a higher performance of the storage system. In a case of constant TOPS, less response time brings about a shallower depth of queue, which means that only fewer resources are required to accomplish the same performance. In addition, for a write request within the storage system, the front end data transfer is eliminated. Therefore, the embodiment of the present disclosure further improves remarkably performance of internal write request.

Figure 15:
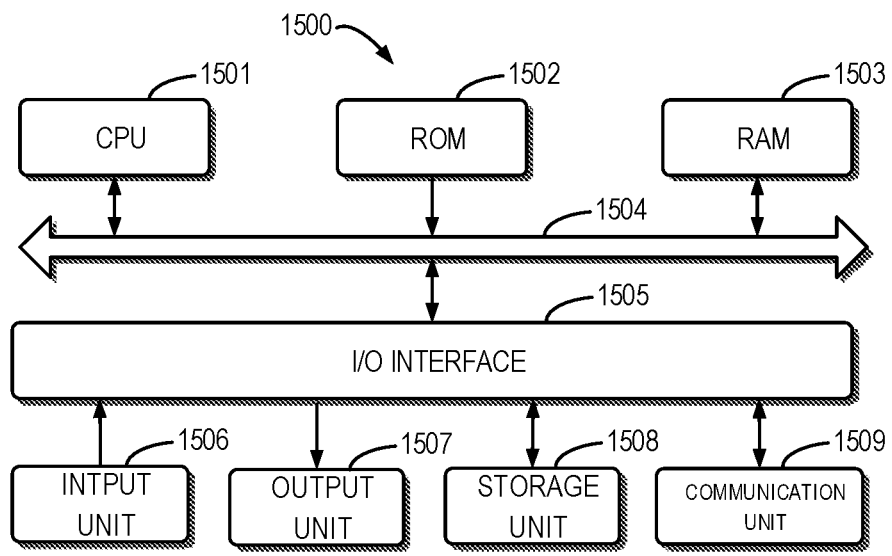
FIG. 15 illustrates a schematic block diagram of a device that can be used to implement an embodiment of the present disclosure.

FIG. 15 illustrates a block diagram of a device 1500 that can be used to implement the embodiments of the present disclosure. As shown in FIG. 15, the device 1500 includes a central processing unit (CPU) 1501 which performs various appropriate actions and processing, based on computer program instructions stored in a read-only memory (ROM) 1502 or computer program instructions loaded from a storage unit 1508 to a random access memory (RAM) 1503. The RAM 1503 stores therein various programs and data required for operations of the device 1500. The CPU 1501, the ROM 1502 and the RAM 1503 are connected via a bus 1504 with one another. An input/output (I/O) interface 1505 is also connected to the bus 1504.

The following components in the device 1500 are connected to the I/O interface 1505: an input unit 1506 such as a keyboard, a mouse and the like; an output unit 1507 including various kinds of displays and a loudspeaker, etc.; a storage unit 1508 including a magnetic disk, an optical disk, and etc.; a communication unit 1509 including a network card, a modem, and a wireless communication transceiver, etc. The communication unit 1509 allows the device 1500 to exchange information/data with other devices through a computer network such as the Internet and/or various kinds of telecommunications networks.

Various processes and processing described above, e.g., the method 400 or 700, may be performed by the processing unit 1501. For example, in some embodiments, the method 400 or 700 may be implemented as a computer software program that is tangibly included in a machine readable medium, e.g., the storage unit 1508. In some embodiments, part or all of the computer programs may be loaded and/or mounted onto the device 1500 via ROM 1502 and/or communication unit 1509. When the computer program is loaded to the RAM 1503 and executed by the CPU 1501, one or more steps of the method 400 or 700 as described above may be performed.

As used herein, the term "includes" and its variants are to be read as open terms that mean "includes, but is not limited to." The term "based on" is to be read as "based at least in part on." The term "one embodiment" and "the embodiment" are to be read as "at least one embodiment." The terms "first," "second," and the like may refer to different or same objects. Other definitions, explicit and implicit, may be included in the context.

As used herein, the term "determining" covers various acts. For example, "determining" may include operation, calculation, process, derivation, investigation, search (for example, search through a table, a database or a further data structure), identification and the like. In addition, "determining" may include receiving (for example, receiving information), accessing (for example, accessing data in the memory) and the like. Further, "determining" may include resolving, selecting, choosing, establishing and the like.

It will be noted that the embodiments of the present disclosure may be implemented in software, hardware, or a combination thereof. The hardware part may be implemented by a special logic; the software part may be stored in a memory and executed by a suitable instruction execution system such as a microprocessor or special purpose hardware. Those skilled in the art would appreciate that the above device and method may be implemented with computer executable instructions and/or in processor-controlled code, and for example, such code is provided on a carrier medium such as a programmable memory or an optical or electronic signal bearer.

Further, although operations of the method according to the present disclosure are described in a particular order in the drawings, it does not require or imply that these operations are necessarily performed according to this particular sequence, or a desired outcome can only be achieved by performing all shown operations. On the contrary, the execution order for the steps as depicted in the flowcharts may be varied. Additionally or alternatively, some steps may be omitted, a plurality of steps may be merged into one step, or a step may be divided into a plurality of steps for execution. It will also be noted that the features and functions of two or more units of the present disclosure may be embodied in one device. In turn, the features and functions of one unit described above may be further embodied in more units.

Although the present disclosure has been described with reference to various embodiments, it should be understood that the present disclosure is not limited to the disclosed embodiments. The present disclosure is intended to cover various modifications and equivalent arrangements included in the spirit and scope of the appended claims.

We claim:

1. A method of storage management, comprising:
   receiving, at a second processor of a storage system, user data and cache metadata from a first cache of a first processor of the storage system, the cache metadata comprising information associated with writing the user data to the storage system;
   preprocessing the cache metadata, such that the user data is accessible to a host via the second processor; and
   performing, in a second cache of the second processor, data processing related to cache mirroring based on the user data and the cache metadata;
   wherein preprocessing the cache metadata comprises:
   moving the cache metadata from a receiving buffer of the second cache to a queue of cache metadata accessible to the host.

2. The method of claim 1, wherein receiving the user data and the cache metadata comprises:
   transferring the user data from a first physical page of the first cache to a second physical page of the second cache; and
   buffering the cache metadata to the receiving buffer of the second cache.

3. The method of claim 1, wherein moving the cache metadata to the queue of cache metadata comprises:
   in response to locking successfully a cache page indicated by the cache metadata, moving the cache metadata to a queue of cache metadata to be processed, to wait for processing by the second processor; and
   in response to failing to lock the cache page, moving the cache metadata to a waiting queue of cache metadata, to wait for locking the cache page by the second processor for the cache metadata.

4. The method of claim 1, wherein performing the data processing comprises:
   adding a physical page storing the user data to a cache page indicated by the cache metadata.

5. The method of claim 1, wherein performing the data processing comprises:
   waking up a background thread to perform the data processing.

6. The method of claim 1, further comprising:
   in response to receiving an I/O request from the host, preprocessing all cache metadata in the second cache that has not been preprocessed; and
   handling the I/O request.

7. The method of claim 1, wherein receiving the cache metadata comprises:
   receiving a cache metadata message comprising the cache metadata and recovery information for recovering the cache metadata message during a failure recovery.

8. The method of claim 7, wherein the recovery information comprises at least one of the following: a processing state, a sending serial number, and a checksum of the cache metadata message.

9. The method of claim 8, further comprising at least one of the follows:
   in response to completion of the preprocessing, changing the processing state from an initial value of "valid" to "preprocessed;"
   in response to the data processing being in progress, setting the processing state to "processing;" and
   in response to the completion of the data processing, setting the processing state to "invalid."

10. The method of claim 7, further comprising:
    in response to the storage system recovering from a failure, recovering the cache metadata message based on the recovery information.

11. The method of claim 10, wherein recovering the cache metadata message comprises at least one of the following:
    determining, based on the processing state, that the cache metadata message is required to be recovered;
    determining, based on the sending serial number, a sequence of the cache metadata message and a further recovered cache metadata message; and
    checking integrity of the cache metadata message based on the checksum.

12. The method of claim 1 wherein receiving the user data and the cache metadata from the first cache of the first processor includes:
    receiving at least some of the data through a communication manager interface (CMI) that connects the first processor and the second processor.

13. An electronic device, comprising:
    at least two processors; and
    at least one memory storing computer program instructions, the at least one memory and the computer program instructions being configured, together with the at least two processors, to cause the electronic device to:
    receive, at a second processor, user data and cache metadata from a first cache of a first processor, the cache metadata comprising information associated with writing the user data to the storage system;
    preprocess the cache metadata, such that the user data is accessible to a host via the second processor; and
    performing, in a second cache of the second processor, data processing related to cache mirroring based on the user data and the cache metadata;
    wherein preprocessing the cache metadata comprises:
    moving the cache metadata from a receiving buffer of the second cache to a queue of cache metadata accessible to the host.

14. The electronic device of claim 13, wherein performing the data processing comprises:
    waking up a background thread to perform the data processing.

15. The electronic device of claim 13, wherein receiving the cache metadata comprises:

receiving a cache metadata message comprising the cache metadata and recovery information for recovering the cache metadata message during a failure recovery.

16. The electronic device of claim 15, wherein the recovery information comprises at least one of the following: a processing state, a sending serial number, and a checksum of the cache metadata message.

17. The electronic device of claim 16, wherein the instructions further cause the electronic device to perform at least one of the following:
in response to completion of the preprocessing, change the processing state from an initial value of "valid" to "preprocessed;"
in response to the data processing being in progress, set the processing state to "processing;" and
in response to the completion of the data processing, set the processing state to "invalid."

18. A computer program product having a non-transitory computer readable medium which stores a set of instructions to perform storage management; the set of instructions, when carried out by computerized circuitry, causing the computerized circuitry to perform a method of:
receiving, at a second processor of a storage system, user data and cache metadata from a first cache of a first processor of the storage system, the cache metadata comprising information associated with writing the user data to the storage system;
preprocessing the cache metadata, such that the user data is accessible to a host via the second processor; and
performing, in a second cache of the second processor, data processing related to cache mirroring based on the user data and the cache metadata;
wherein preprocessing the cache metadata comprises:
moving the cache metadata from a receiving buffer of the second cache to a queue of cache metadata accessible to the host.

19. The computer program product of claim 18, wherein performing the data processing comprises:
waking up a background thread to perform the data processing.

20. The computer program product of claim 18, wherein receiving the cache metadata comprises:
receiving a cache metadata message comprising the cache metadata and recovery information for recovering the cache metadata message during a failure recovery.

21. The computer program product of claim 20, wherein the recovery information comprises at least one of the following: a processing state, a sending serial number, and a checksum of the cache metadata message.

22. The computer program product of claim 21, wherein the method further comprises at least one of the following:
in response to completion of the preprocessing, changing the processing state from an initial value of "valid" to "preprocessed;"
in response to the data processing being in progress, setting the processing state to "processing;" and
in response to the completion of the data processing, setting the processing state to "invalid."

23. A method of storage management, comprising:
receiving, at a second processor of a storage system, user data and cache metadata from a first cache of a first processor of the storage system, the cache metadata comprising information associated with writing the user data to the storage system;
preprocessing the cache metadata, such that the user data is accessible to a host via the second processor; and
performing, in a second cache of the second processor, data processing related to cache mirroring based on the user data and the cache metadata;
wherein performing the data processing comprises:
waking up a background thread to perform the data processing.

24. A method of storage management, comprising:
receiving, at a second processor of a storage system, user data and cache metadata from a first cache of a first processor of the storage system, the cache metadata comprising information associated with writing the user data to the storage system;
preprocessing the cache metadata, such that the user data is accessible to a host via the second processor; and
performing, in a second cache of the second processor, data processing related to cache mirroring based on the user data and the cache metadata; and
further comprising at least one of the following:
in response to completion of the preprocessing, changing the processing state from an initial value of "valid" to "preprocessed;"
in response to the data processing being in progress, setting the processing state to "processing;" and
in response to the completion of the data processing, setting the processing state to "invalid."

* * * * *